US008762584B2

(12) United States Patent
Buck et al.

(10) Patent No.: US 8,762,584 B2
(45) Date of Patent: Jun. 24, 2014

(54) SYSTEM AND METHOD FOR AUTOMATIC PROVISIONING OF ONSITE NETWORKING SERVICES (75) Inventors: Michael L. Buck, Payson, UT (US); Richard D. Jones, Elk Ridge, UT (US)

(73) Assignee: Novell, Inc., Provo, UT (US)

( * ) Notice: Subject to any disclaimer, the term of this patent is extended or adjusted under 35 U.S.C. 154(b) by 0 days.

(21) Appl. No.: 13/366,918

(22) Filed: Feb. 6, 2012

(65) Prior Publication Data

US 2012/0134300 A1 May 31, 2012

Related U.S. Application Data (63) Continuation of application No. 09/739,011, filed on Dec. 19, 2000, now Pat. No. 8,145,798.

(60) Provisional application No. 60/200,759, filed on May 1, 2000.

(51) Int. Cl.
*G06F 13/14* (2006.01)
*H04L 12/14* (2006.01)
*H04L 12/26* (2006.01)

(52) U.S. Cl.
USPC ............... 710/8; 709/203; 714/25; 717/173; 717/178

(58) Field of Classification Search
CPC combination set(s) only.
See application file for complete search history.

(56) References Cited

U.S. PATENT DOCUMENTS

| 5,845,077 | A | * | 12/1998 | Fawcett | 709/221 |
|---|---|---|---|---|---|
| 5,920,725 | A | * | 7/1999 | Ma et al. | 717/171 |
| 6,006,034 | A | | 12/1999 | Heath et al. | 395/712 |
| 6,009,274 | A | | 12/1999 | Fletcher et al. | 395/712 |
| 6,012,088 | A | | 1/2000 | Li et al. | 709/219 |
| 6,049,671 | A | | 4/2000 | Slivka et al. | 395/712 |
| 6,070,187 | A | | 5/2000 | Subramaniam et al. | 709/220 |
| 6,122,664 | A | | 9/2000 | Boukobza et al. | 709/224 |
| 6,131,120 | A | | 10/2000 | Reid | 709/225 |
| 6,137,805 | A | | 10/2000 | Berstis | 370/428 |
| 6,151,643 | A | | 11/2000 | Cheng et al. | 710/36 |
| 6,167,567 | A | * | 12/2000 | Chiles et al. | 717/173 |
| 6,266,697 | B1 | * | 7/2001 | Miyamoto | 709/224 |
| 6,336,152 | B1 | | 1/2002 | Richman et al. | |

(Continued)

FOREIGN PATENT DOCUMENTS

| EP | 1 021 015 A2 | 7/2000 |
|---|---|---|
| KR | 2001086893 A | 9/2001 |

OTHER PUBLICATIONS

The Interim Local Management Interface (ILMI); www.home.cs.utwente.nl/~sprenkel/thesis/THS_28.HTM; printed Oct. 23, 2000; 2 pages.

(Continued)

*Primary Examiner* — Ilwoo Park
(74) *Attorney, Agent, or Firm* — Schwegman, Lundberg & Woessner, P.A.

(57) ABSTRACT

The system and method described herein may activate an automatic provisioning system within customer premise equipment via a digital subscriber line, cable modem, or other residential hub or gateway interface and access a remote directory service to locate appropriate addressing and other information to initialize the customer premise equipment. The gateway interface may automatically update a configuration, heal bugs, and perform other maintenance and tasks to manage the customer premise equipment. Multiple gateway interfaces or products or services associated therewith may be configured at one premise and version control may be maintained to ensure compatibility.

28 Claims, 5 Drawing Sheets

(56) References Cited

U.S. PATENT DOCUMENTS

| | | | |
|---|---|---|---|
| 6,529,938 B1 | 3/2003 | Cochran et al. | 709/203 |
| 6,539,483 B1 | 3/2003 | Harrison et al. | 713/201 |
| 6,587,874 B1 | 7/2003 | Golla et al. | 709/220 |
| 6,678,265 B1 | 1/2004 | Kung et al. | 370/352 |
| 6,678,727 B1 | 1/2004 | Lee et al. | 709/221 |
| 6,711,645 B1 | 3/2004 | Chari et al. | 710/302 |
| 6,724,881 B1 | 4/2004 | McAllister et al. | 379/220.01 |
| 6,745,224 B1 | 6/2004 | D'Souza et al. | 709/202 |
| 2008/0065767 A1* | 3/2008 | Stachura et al. | 709/224 |

OTHER PUBLICATIONS

"What is DHCP"; http://kb.indiana.edu/data/adov.html; printed Sep. 5, 2000; 2 pages.

"Dynamic Host Configuration Protocol"; www.whatis.com/WhatIs_Definition_Page/0,4152,213894,00.html; printed Sep. 5, 2000; 2 pages.

"Protocol Directory—ILMI"; www.protocols.com/pbook/ilmi.htm; printed Oct. 23, 2000; pp. 1-12.

"ACE-SNMP, Web Based SNMP Network Management System, An Introductory Overview of SNMP"; diversified data resources, inc. (ddri); Novato, CA 94947; pp. 1-32.

"Novell—NDS eDirector "; www.novell.com/products/nds/; printed Jul. 31, 2000; 4 pages.

"Novell—ZENworks"; www.novell.com/products/zenworks/; printed Jul. 31, 2000; 6 pages.

"Novell—ConsoleOne™"; www.novell.com/product/netconsole/consoleone/; printed Jul. 31, 2000; 5 pages.

"LDAP: The next-generation directory?"; www.sunworld.com/sunworldonline/swol-10-1996/swol-10-ldap_p.html; printed Aug. 2, 2000; 6 pages.

"Open Services Gateway Initiative (OSGi), Specification Overview"; Version 1.0, Jan. 2000; 12 pages.

"OSGi, Charter"; www.osgi.org/about/charter.html; printed Jan. 1, 2001; 2 pages.

"OSGi, Welcome to OSGi"; www.osgi.org/; printed Aug. 8, 2000; 2 pages.

"OSGi, About Osgi:Introduction"; www.osgi.org/about/index.html; printed Aug. 8, 2000; 2 pages.

"OSGI, Membership Benefits"; www.osgi.org/about/benefits.asp; printed Aug. 8, 2000; 2 pages.

"OSGI, Members"; www.osgi.org/about/members.html; printed Aug. 8, 2000; 2 pages.

"OSGI, White Paper, The Future of Home & Small Office e-Services"; www.osgi.org/about/whitepaper.html; printed Jan. 10, 2001; pp. 1-8.

"OpenDSL, Mission Statement"; www.opendsl.org/; printed Oct. 20, 2000; 1 page.

OpenDSL, OpenDSL White Paper; 28 pages.

"DSL Forum Accelerates DSL Delivery Process"; Post Ireland Meeting; www.dslforum.org/PreseRoom/news_Ireland_091100.html; printed Oct. 20, 2000; 2 pages.

"DSL Forum Interim Meeting Accelerates DSL CPE Autoconfiguration Work, CPE Auto-configuration"; www.dslforum.org/PressRoom/News_CPE_101100.html; printed Oct. 20, 2000; 2 pages.

"ADSL Forum System Reference Model" Technical Report; www.dslform.org/adsl_reference_model.html; printed Oct. 20, 2000; pp. 1-4.

"Technical Frequently Asked Questions"; last updated Sep. 1998; www.dslforum.org/tech_faqs.html; printed Oct. 20, 2000, pp. 1-9.

"Virata"; Personal Broadband Services: DSL and ATM; by Jim Lane; © 1998 Virata; 96 pages.

"OSGI, OSGi Service Gateway Specification"; Release 1.0; May 2000.

* cited by examiner

SYSTEM AND METHOD FOR AUTOMATIC PROVISIONING OF ONSITE NETWORKING SERVICES

PRIORITY

This application is a continuation of U.S. patent application Ser. No. 09/739,011, entitled "System and Method for Automatic Provisioning of Onsite Networking Services," filed on Dec. 19, 2000, which claims the benefit of U.S. Provisional Patent Application Ser. No. 60/200,759, entitled "System and Method for Automatic Provisioning of Onsite Networking Services," filed on May 1, 2000, the contents of which are hereby incorporated by reference in their entirety.

FIELD OF INVENTION

The invention relates to the field of networking, and more particularly to enabling automatic provisioning of CPE (Customer Premise Equipment) for efficient delivery of network-based services.

BACKGROUND OF THE INVENTION

The pervasiveness of Internet and other network technology has led to increasing quantities and varieties of network-based services. Residential and business consumers seeking to take advantage of these services require a gateway, hub, or other type of CPE (Customer Premise Equipment) for interfacing to the Internet or other network. Unfortunately, when a CPE is initially installed, a number of complicated and time-consuming operations must be undertaken, such as to configure IP addresses, establish TCP/IP sockets, stacks or other protocol support. Such operations often can only be performed by a technician or programmer with the special skills and equipment. Moreover, changes in services or end-user equipment may require that the CPE be periodically reconfigured. These configuration obstacles reduce the attractiveness of on-premise network products in general, and the installation of CPE (Customer Premise Equipment) in particular. These and other drawbacks exist.

SUMMARY OF THE INVENTION

The invention overcoming these and other problems in the art relates to a system and method for automatic provisioning of onsite networking services which alleviate the need for manual configuration of CPE, in part by establishing a connection between the CPE to be installed and a remote directory service dedicated to management and automated configuration of the device, in whole or part, without necessary intervention by a system administrator, technician, or end user.

An object of the invention in one regard is to provide a CPE interface containing preprogrammed provisioning information to detect and transmit IP address and other resources, or to provision the ATM (Asynchronous Transfer Mode) virtual circuit from a home or other site.

Another object of the invention is to provide a CPE interface and associated directory service which may periodically maintain and update the configuration settings on the CPE interface, such as for debugging, self-healing or service upgrade purposes.

Another object of the invention is to provide a remote directory service which is capable of detecting, identifying and servicing a variety of different types of CPE interface hardware, such as cable modems, ISDN, DSL or other products or services.

Another object of the invention is to provide a remote directory service which is capable of detecting, identifying and managing video, firewall, or other value-added services that can nm on the CPE interface hardware.

BRIEF DESCRIPTION OF THE DRAWINGS

The invention will be described with reference to the accompanying drawings, in which like elements are referenced with like numbers.

DETAILED DESCRIPTION OF THE PREFERRED EMBODIMENTS

Figure 1:
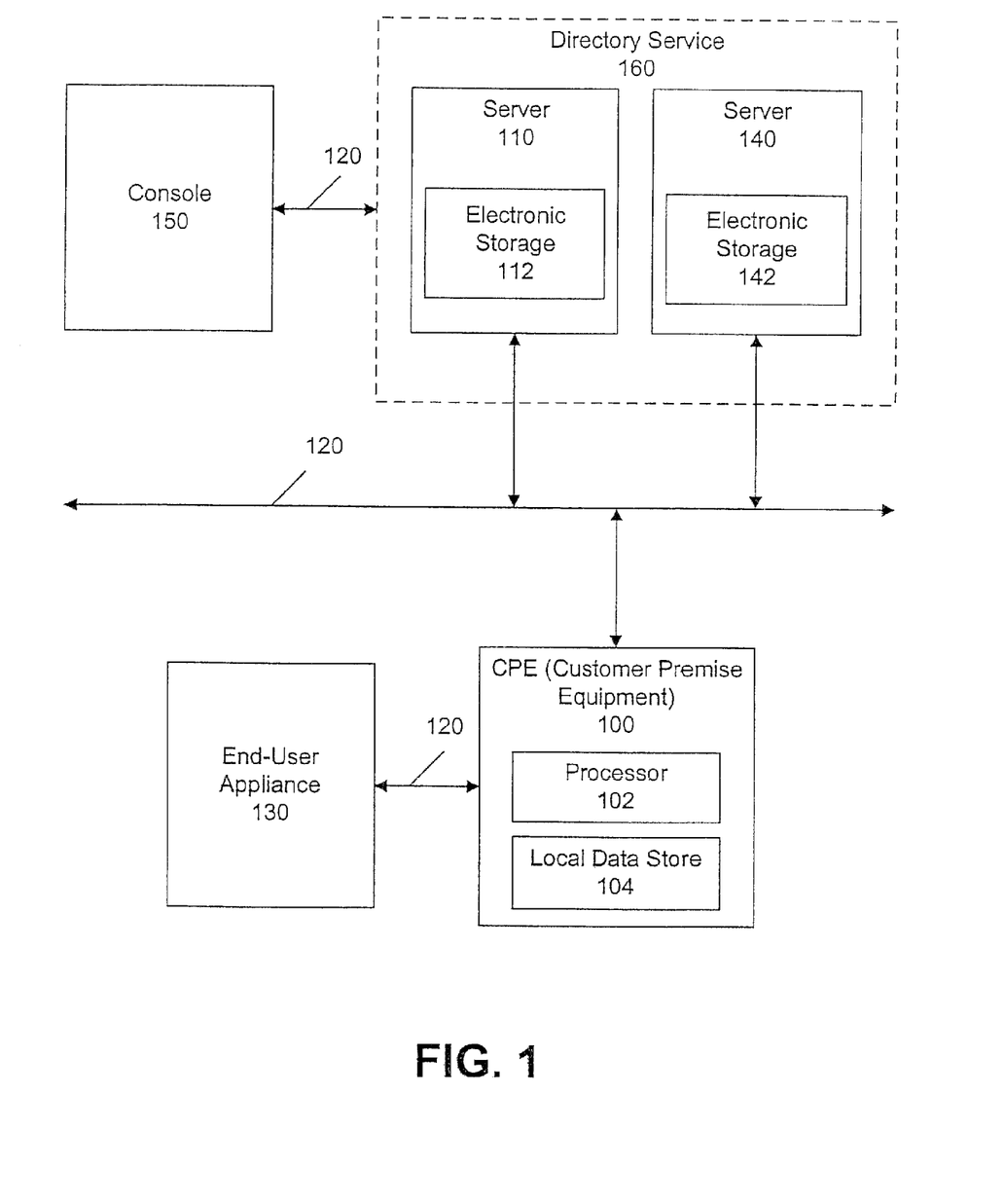
FIG. 1 is a schematic diagram of a system architecture configured for automated provisioning of network services, according to one embodiment of the invention.

In general, the invention relates to the installation, configuration, or provisioning of Customer Premise Equipment (CPE) 100, which may be connected to end-user appliances 130 and to a directory service 160 via communication links 120, as depicted in FIG. 1.

CPE 100 provides an interface between sources of network-based services and end-user appliances 130. CPE 100 may be or include, for instance, a residential or business gateway, hub, router or other device that is sold or leased by telephone carriers, Internet Service Providers or others that is installed in residences, office buildings, or other premises for delivery of network-based services to end-user appliances 130. CPE 100 may further include a processor 102 that may be or include, for example, a microprocessor such as an Intel x86-based device, a Motorola 68K or PowerPC™ device, a MIPS, Hewlett-Packard Precision™, or Digital Equipment Corp. Alpha™ RISC processor, a microcontroller, a digital signal processor (DSP), or other general or special purpose device operating under programmed control. CPE 100 may also include local data store 104 which may be implemented as RAM (random access memory) or EPROM (electronically programmable read only memory), hard drive storage, CDROM or rewritable CDROM or other magnetic, optical or other media, and other associated components connected over an electronic bus, as will be appreciated by persons skilled in the art.

End-user appliances 130 are devices that interact with network-based services through a CPE. End-user appliances 130 may be or include: a WebTV™ unit; a radio-enabled Palm™ Pilot or similar unit; a television set-top box; a networkable game-playing console such as Sony Playstation™ or Sega Dreamcast™; a browser-equipped cellular telephone; a personal computer; a home theater, digital audio system, video player, or other audio or video entertainment appliance; a camera, microphone, motion detector, magnetic switch, or other device employed for surveillance or for other purposes; devices that monitor the operation and use of electric, gas, water, or other utilities; a refrigerator, freezer, dishwasher, washing machine, clothes dryer, microwave, coffee maker, furnace, air conditioner, or other household appliance; and other devices used to transmit or receive executable programs or data.

Directory service 160 may contain configuration data and programs used to provision a CPE 100 for delivery of network-based services to end-user appliances 130. In delivering such services, application code may be executed on CPE 100, end-user appliances 130, or both. Directory service 160 may be a distributed directory service, for example where it manages data on servers 110 and 140 as depicted in FIG. 1. Additionally, the organization of directory service 160 may be hierarchical, for instance where server 110 is a global server and server 140 is a regional server. In another embodiment, directory service 160 may be implemented in a network of three or more servers. In yet another embodiment, directory service 160 may be implemented on a single server. Interfaces to directory service 160 may be compliant with the X.500 standard familiar to those skilled in the art, and may also function in accordance with Lightweight Directory Access Protocol (LDAP), such as with the NDS® eDirectory™ product. Other directory service products, using the same or different protocol, could also be utilized to practice the invention.

Servers 110 and 140 may be or include, for instance, a workstation running the Microsoft Windows™ NT™, Windows™ 2000, Unix, Linux, Xenix, IBM AIX™, Hewlett-Packard UX™, Novell Netware™, Sun Microsystems Solaris™, OS/2™, BeOS™, Mach, Apache, UpenStep™ or other operating system or platform. Servers 110 and 140 may further include or interface to electronic storage 112 and 142, respectively. Electronic storage 112 and 142 may in turn be, include or interface to, for example, the Oracle™ relational database sold commercially by Oracle Corp. Other databases, such as Informix™, DB2 (Database 2), Sybase or other data storage or query formats, platforms or resources such as OLAP (On Line Analytical Processing), SQL (Standard Query Language), a storage area network (SAN), Microsoft Access™ or others may also be used, incorporated or accessed in the invention.

A console 150 may be utilized to manage the operations of directory service 160. Console 150 may be a Java-based Graphical User Interface (GUI) utility such as Novell ConsoleOne™. Alternatively, console 150 may be implemented with a standard HTML Web browser. Console 150 may nm on server 110 and 140, or may, for example, run on a workstation that interfaces to server 110 and 140 via communication link 120.

As depicted in FIG. 1, major system components may be connected via communication link 120. Communication link 120 may be, include or interface to any one or more of, for instance, the Internet, an intranet, a PAN (Personal Area Network), a LAN (Local Area Network), a WAN (Wide Area Network) or a MAN (Metropolitan Area Network), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port such as a V.90, V.34 or V.34 bis analog modem connection, a DOCSIS (Data Over Cable Service Interface Specification) compliant or other cable modem, an ATM (Asynchronous Transfer Mode) connection, or an FDDI (Fiber Distributed Data Interface) or CDDI (Copper Distributed Data Interface) connection. Communications link 120 may furthermore be, include or interface to any one or more of a WAP (Wireless Application Protocol) link, a GPRS (General Packet Radio Service) link, a GSM (Global System for Mobile Communication) link, a CDMA (Code Division Multiple Access) or TDMA (Time Division Multiple Access) link such as a cellular phone channel, a GPS (Global Positioning System) link, CDPD (cellular digital packet data), a RIM (Research in Motion, Limited) duplex paging type device, a Bluetooth radio link, or an IEEE 802.11-based radio frequency link. Communications link 120 may yet further be, include or interface to any one or more of an RS-232 serial connection, an IEEE-1394 (Firewire) connection, a Fibre Channel connection, an IrDA (infrared) port, a SCSI (Small Computer Systems Interface) connection, a USB (Universal Serial Bus) connection, a Public Switched Telephone Network (PSTN), or other wired or wireless, digital or analog interface or connection.

Not all instances of communication link 120 shown in FIG. 1 must be identical. Additionally, the link between any two system components may change over time. For example, CPE 100 may initially communicate with server 110 or server 140 via a public switched telephone network to obtain IP addressing, then switch to packet-based Internet communication.

Figure 2:
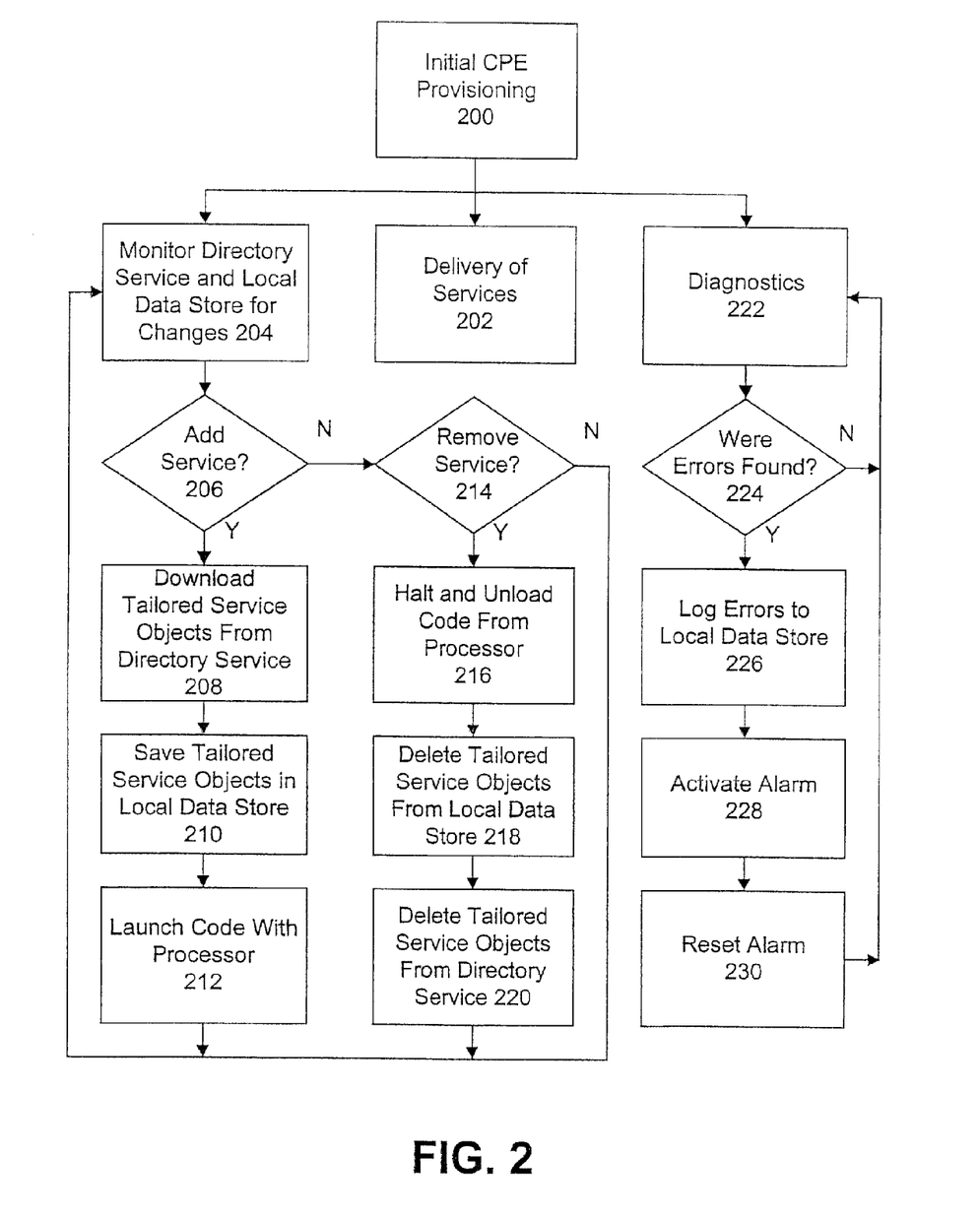
FIG. 2 is a flow diagram illustrating processes for initial CPE (Customer Premise Equipment) provisioning, diagnostics, and the delivery of broadband services, according to one embodiment of the invention.

The system illustrated in FIG. 1 may be advantageously configured to perform the processes depicted in FIG. 2. Initial CPE provisioning in step 200 may allow for the delivery of broadband services to consumers in step 202. Step 200 provisioning is further depicted in FIG. 4.

In the delivery of services, step 202, application code may be executed on CPE 100, end-user appliances 130, or both. Consider, for example, the case where end-user appliance 130 is a power-monitoring device. In this instance, application code may first be sent from directory service 160 to CPE 100, then from CPE 100 to the power-monitoring device. The power-monitoring device may then run the application code and may even communicate directly with the power company. In the embodiment just described, CPE 100 has not executed any application code. In other uses, application code may be executed on both CPE 100 and end-user appliance 130. An example might be the case of on demand video services. Here, CPE 100 may execute code in order to download and store videos that are ordered by an end-user, and perhaps also to track licensing of the video and to perform billing tasks related to video usage. End-user video appliance 130 may also execute code, such as code necessary to interface between an end-user and CPE 100 in order to play, pause, rewind, or fast-forward videos. So, in this case, delivery of services may require that application code run on both CPE 100 and end-user appliance 130.

Figure 5:
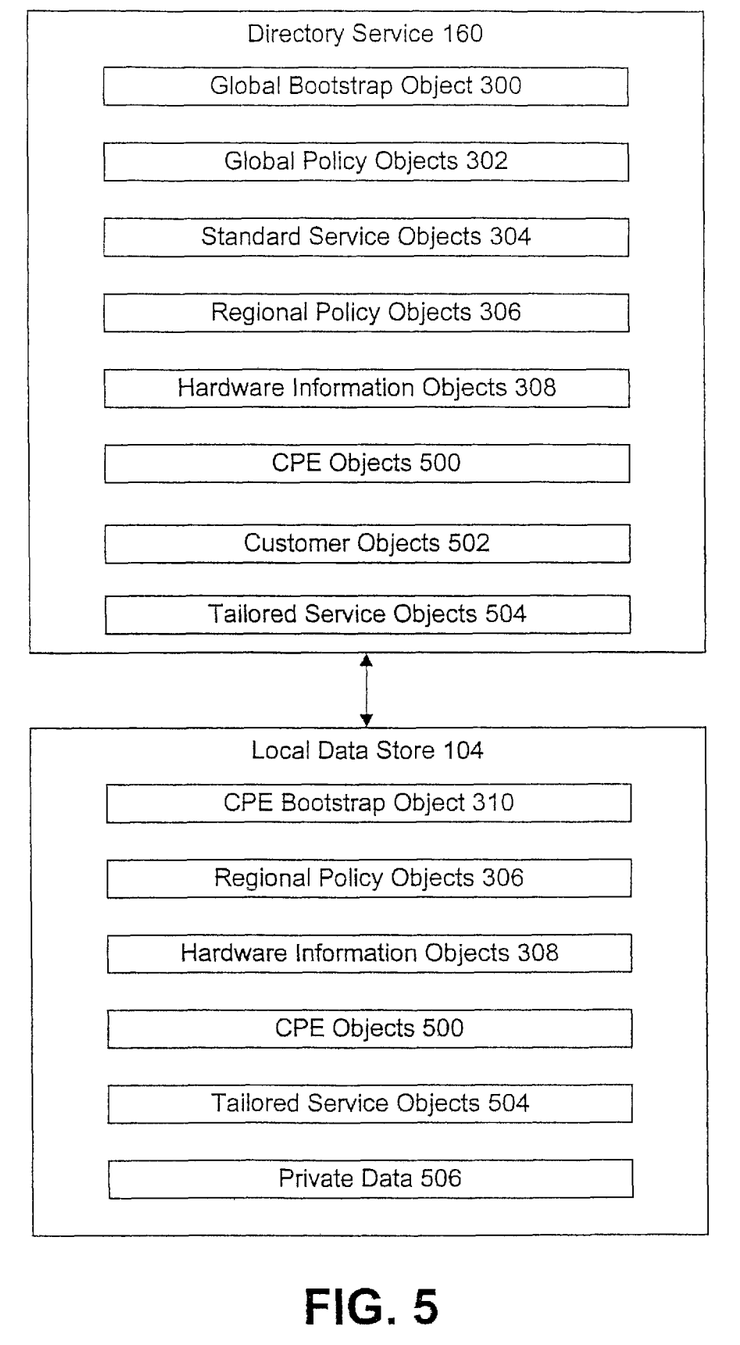
FIG. 5 is a schematic diagram depicting a final set of software objects in the directory and on the CPE (Customer Premise Equipment) after automated provisioning, according to one embodiment of the invention.

Over time, a consumer of broadband services may choose to make changes by, for example, subscribing to different broadband services, adding or deleting end-user appliances 130, or by changing CPE 100. Service providers and administrators of the delivery system may also initiate various changes in how services are delivered. Such changes may require reconfiguration of the delivery system shown in FIG. 1. In one embodiment of the invention, after step 200 of initial CPE provisioning, parameters representing the system configuration are embedded in software objects as illustrated in FIG. 5. It is one aspect of the invention to provide automated maintenance of the system configuration by copying or deleting software objects when necessary.

Steps 204 through 220 in FIG. 2 illustrate one embodiment of the automated maintenance process. In step 204, CPE 100 may monitor directory service 160 and local data store 104 for changes in software objects that relate to that instance of CPE 100. Monitoring step 204 may operate simultaneously with the delivery of broadband services in step 202. In step 206, CPE 100 may determine whether a broadband service is being added. If so, CPE 100 may download tailored service objects 504 from directory service 160 in step 208, saving a copy of those same objects to local data store 104 in step 210. In step 212, CPE 100 may use processor 102 to launch the executable application code contained in tailored service objects 504 for the delivery of new broadband services to end-user appliances 130. In alternative embodiments, the application code may be executed on CPE 100, on end-user appliances 130, or both. If, on the other hand, it is determined in step 206 that services are not being added, and it is further determined in step 214 that services are to be removed, then CPE 100 may halt and unload any associated code being executed by processor 102 in step 216, and, in step 218, may delete the corresponding tailored service objects 504 stored in local data store 104. In order to prevent download of these canceled services to CPE 100 at a later time, the copy of the associated tailored service objects 504 stored in directory service 160 may also be deleted in step 220.

Step 200 provisioning may also enable diagnostic testing at CPE 100, concurrent with the delivery of services in step 202, as shown by step 222. Step 222 may, for example, perform diagnostic testing of CPE 100, end-user appliances 130, or communication link 120. If no errors are found, step 224 may direct that diagnostic testing step 222 continue. If, on the other hand, errors are present, step 224 may direct that the errors be logged in step 226 and cause an alarm to be activated in step 228. After a predetermined time delay or acknowledgement by a user or system administrator, the alarm may be reset in step 230 and the diagnostic testing of step 222 may resume. In an alternative embodiment, diagnostic step 222 may operate only on demand, either under automatic computer control or through manual operation. Diagnostics step 222 may also be combined with a self-healing process for automatically repairing errors, although this embodiment is not depicted in FIG. 2.

Figure 3:
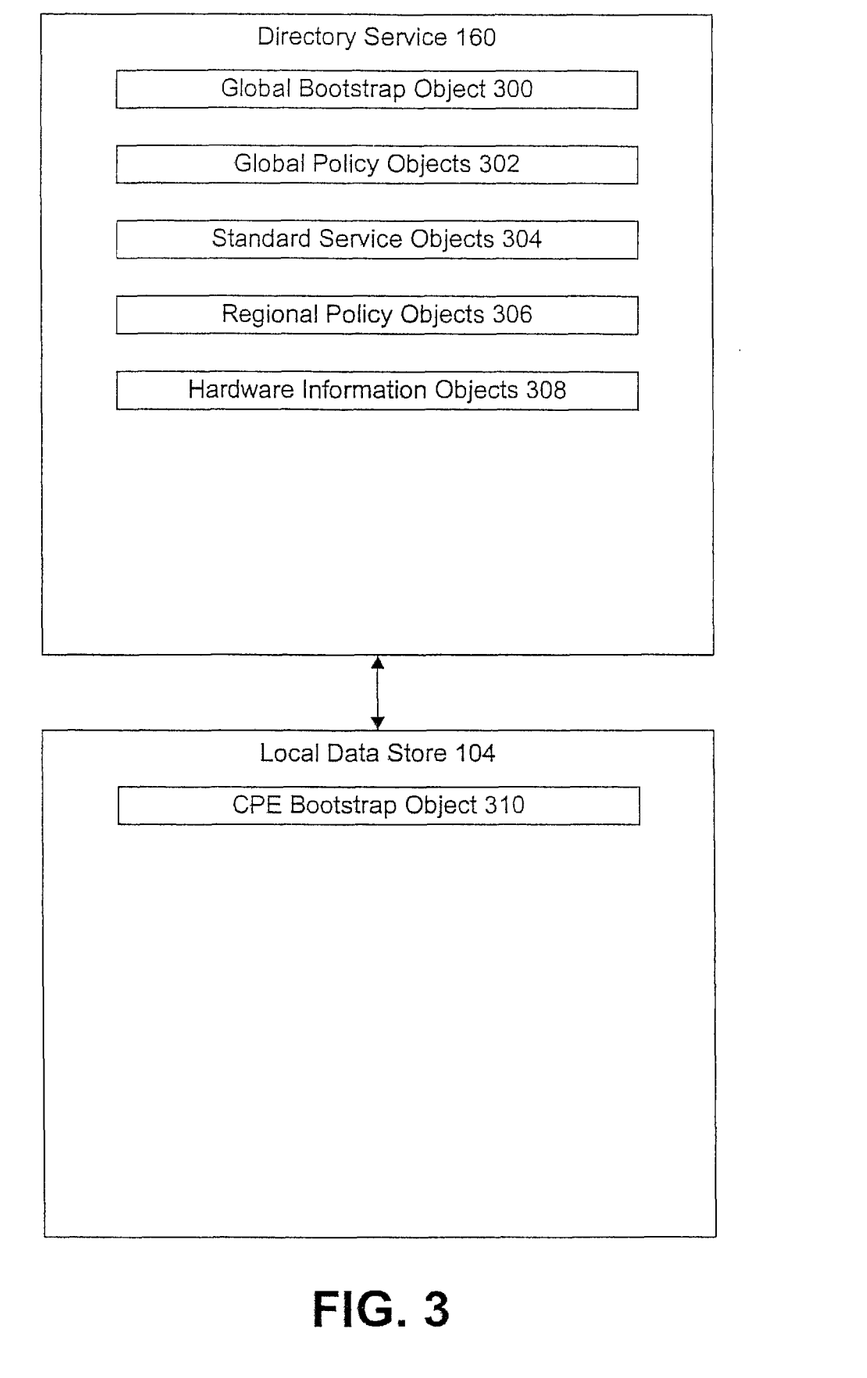
FIG. 3 is a schematic diagram depicting an initial set of software objects in the directory and on the CPE (Customer Premise Equipment) prior to automated provisioning, according to one embodiment of the invention.

FIG. 3 depicts the types of objects that may be present in directory service 160 and local data store 104 prior to operation of initial CPE provisioning step 200. The following schema for each object type is illustrative of one embodiment. Global bootstrap object 300 may contain, for example, class name, class size, and a configuration agent. In one embodiment the configuration agent may be implemented in Java; in another embodiment the configuration agent may be native executable code such as that compiled from the "C" Language. Global policy object 302 may include the IP address of regional severs and a default regional policy. Standard service objects 304 may contain start date, end date, price, billing unit, unit usage, hardware requirements, Java code associated with the broadband services to be delivered, and other necessary service configuration and operating parameters. Regional policy objects 306 may contain a poll interval, the possible location for CPE objects 500, templates for creating CPE objects 500, a change flag, a listing of services, the location of hardware information and service objects, and a server security certificate. The hardware information objects 308 may define the properties of CPE 100, for example, the manufacturer, model, serial number, and various communication parameters. Finally, CPE bootstrap object 310 may contain initial addressing, passwords, and certificates necessary to communicate with other servers 110 and 140 for automatic provisioning. CPE bootstrap object 310 may have been written to local data store 104 at the point of manufacture, or at least before the sale of CPE 100 to a consumer. In an alternative embodiment, CPE bootstrap object 310 may be written to a removable memory device such as a floppy disk, compact disc, or smart card.

In an embodiment of the invention not depicted in FIG. 3, directory service 160 may also contain customer objects 502. This may be true, for instance, where an existing telephone service provider will now be providing DSL service to the same customer, and where that service provider already has customer information stored in a data base. Customer objects 502 may include, for example, the name and address of the consumer of broadband services, and, perhaps, the customer's preferred method of payment, among other information.

As indicated above, application of the invention may involve multiple instances of any given object type. For example, there may be hundreds of different standard service objects 304 made available by hundreds of providers of broadband services. Likewise, there may be millions of hardware information objects 308, identifying each specific application of dozens of different CPE 100 models. Other object types may also have multiple instances.

Figure 4:
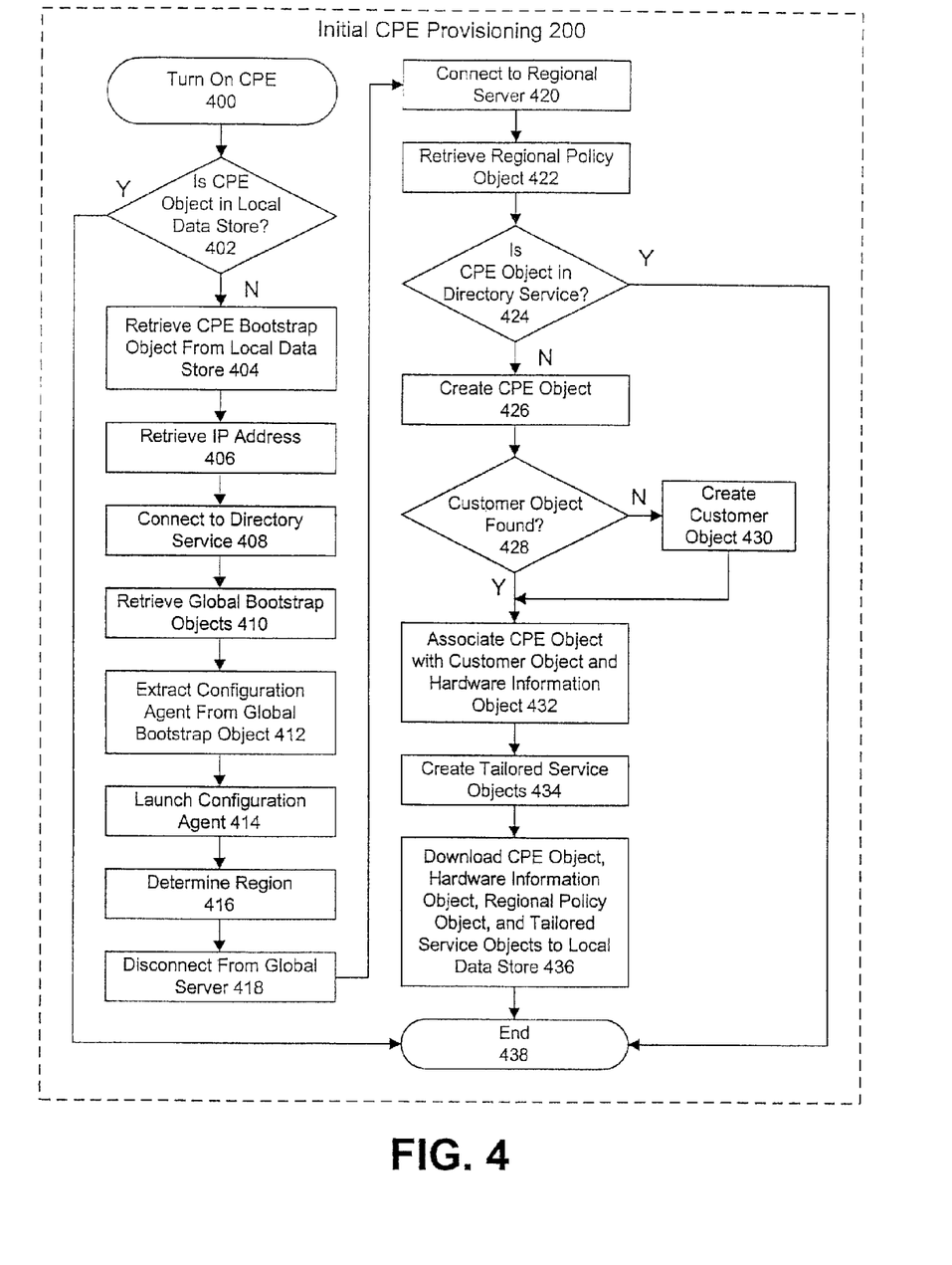
FIG. 4 is a flow diagram illustrating the operational steps associated with automated provisioning of a CPE (Customer Premise Equipment), according to one embodiment of the invention.

FIG. 4 further details one embodiment of initial CPE provisioning step 200. The process begins in step 400 when CPE 100 is turned on. If CPE object 500 is found in local data store 104, then step 402 may direct the process to end at step 438. If, on the other hand, the CPE object 500 is not found in local data store 104, then step 402 may direct the provisioning process to continue to step 404, where the CPE bootstrap object 310 is retrieved from local data store 104 or an alternative location as indicated above.

In step 406, CPE 100 may obtain an IP (Internet Protocol) address from a DHCP (Dynamic Host Configuration Protocol) server, which may be server 140, for example. To perform this operation, CPE 100 may broadcast a DISCOVER message looking for a DHCP server. A router may direct CPE 100 to an appropriate DHCP server. CPE 100 may then send a REQUEST packet, to which the DHCP server replies with an OFFER. When CPE 100 sends an ACK packet, the DHCP server may assign an IP address to CPE 100 and may further configure other servers for communication with CPE 100.

In an alternative embodiment of step 406, an IP address may be retrieved directly from CPE bootstrap object 310, the LP address having been assigned as part of the initial configuration of CPE 100.

Techniques involving the use of SNMP (Simple Network Management Protocol) for automatic retrieval of the IP address may also be used as an alternative embodiment of step 406. For example, ILMI (Integrated Local Management Interface) or MMI (Modem Management Interface) tools familiar to those skilled in the art of network management protocols may be employed to transport the IP address from directory 160 to CPE 100.

In yet another embodiment of step 406, IP addressing may be hosted by a DSLAM (Digital Subscriber Line Access Multiplexer), for example by using a LDAP (Lightweight Directory Access Protocol) agent to retrieve the IP address from policy objects in directory 160, and by relying on ILMI or MMI to transport the IP address to CPE 100.

Once CPE 100 secures an IP address, it may then connect to directory service 160 via the Internet or other instance of communication link 120 in step 408 in order to retrieve global bootstrap object 300 in step 410. As indicated above, global bootstrap object 300 may contain a configuration agent. This agent may be extracted in step 412 and launched in step 414 to perform subsequent tasking in initial CPE provisioning step 200.

In step 416, the agent may determine the appropriate region for the instance of CPE 100 that is being automatically provisioned. In one embodiment of step 416, the agent may use the TCP/IP address obtained from the DHCP server to determine the regional policy to which it is assigned. Suppose, for example, that the DHCP server assigned a TCP/IP address of 151.155.128.25. The agent may build an object search string of 151__155__128_*, perform an LDAP search, and obtain region ID 151__155__128_ProvoSouth_CentralOffice_USWest. In another embodiment of step 416, the agent may use a premise circuit ID to determine the region to which it is assigned. For example, the agent may make an IP multicast or SNMP (Simple Network Management Protocol) query to a specific port of CPE 100, and receive an ID of 64_YGGA__610271 in response. The agent may then build an LDAP search string of 64_YOGA_* that returns a region ID 64_YGGA_ProvoSouth_CentralOffice_USWest.

Having identified the region, the agent may now retrieve regional policy object 306 in step 422. As shown in FIG. 4, it may be necessary to first disconnect CPE 100 from a global server (server 110 for instance) in step 418, then connect CPE 100 to a regional server (for example, server 140) in step 420. In other embodiments of initial provisioning step 200, steps 418 and 420 may not be necessary, either because all objects reside on a single server, or because directory service 160 is distributed in nature, providing access to objects on multiple servers without requiring CPE 100 to change its connection.

CPE object 500 may represent an instance of CPE 100 in directory 160. Among other things, CPE object 500 may reference the service objects 304, regional policy object 306, and hardware information object 308 that are applicable to that instance of CPE 100. Step 424 illustrates that if the agent can find CPE object 500 in directory 160, then step 402 may direct the process to end at step 434. Otherwise, initial CPE provisioning step 200 may continue in step 426 to create CPE object 500.

There are at least two different embodiments of step 426. In one embodiment, an agent running on CPE 100 may create CPE object 500 (for itself) in directory service 160. In another embodiment of step 426, an agent on a Web server may create CPE object 500. In the latter case, information about CPE 100 may be sent to a Web server or gathered by the Web interface. The Web server agent may also validate that it has sufficient information to complete the operation before storing CPE object 500 in directory service 160.

In step 428, the system searches for the appropriate instance of customer object 502. If customer object 502 is not found, then it may be created, in step 430, according to the same alternative embodiments described for step 426 above. In an alternative embodiment of initial CPE provisioning step 200, there may not be a customer object 502. Instead, all customer information may be included in CPE object 500. It may be advantageous to keep CPE and customer data separate, however, for the case where a single customer has multiple instances of CPE 100.

In step 432, the CPE agent may associate the appropriate hardware information object 308 with the newly created CPE object 500 and customer object 502. In execution of this step, CPE 100 may determine its network circuit identifier, telephone number, or other connection information, in order to make the association with customer object 502.

Then, in step 434, tailored service objects 504 may be created, adapting the applicable standard service objects 304 to the format specified in hardware information object 308 associated with the newly created CPE object 500. Thus, broadband services may be packaged for a specific consumer based on the specific services that he or she has subscribed to, and the specific type of CPE 100 that a consumer is using.

Before these services can be executed, however, it may be necessary that they reside on CPE 100. In step 436, then, at least one instance of regional policy objects 306, hardware information objects 308, CPE objects 500, and tailored service objects 504 may be downloaded from directory 160 to local data store 104. In one embodiment of step 436, ATM VC (Virtual Circuits) may be employed to transport provisioning information from policy objects in directory 160 to CPE 100.

FIG. 5 shows the types of objects that may reside in directory service 160 and local data store 104 after initial CPE provisioning step 200 has been executed. In addition to the object types described above, local data store 104 may also contain certain private data 506, which is not managed by directory service 160.

The foregoing description of the invention is illustrative, and variations in configuration and implementation will occur to persons skilled in the art. The scope of the invention is accordingly intended to be limited only by the following claims.

What is claimed is:

1. A system for automatically provisioning onsite networking services, comprising:
   a directory service that includes a customer premise equipment object to represent a customer premise equipment instance and a tailored service object to provision the customer premise equipment instance represented with the customer premise equipment object;
   a server associated with the directory service, wherein the server includes one or more processors configured to:
   create the customer premise equipment object to represent the customer premise equipment instance and the tailored service object to provision the customer premise equipment instance in the directory service;
   download the customer premise equipment object and the tailored service object from the directory service to a data store at the customer premise equipment instance, wherein the data store is configured to store the customer premise equipment object and the tailored service object at the customer premise equipment instance;
   monitor the customer premise equipment object or the tailored service object associated with the customer premise equipment instance in the directory service response to a request from the customer premise equipment instance;
   enable diagnostic testing on the customer premise equipment and configure the customer premise equipment to log any errors detected and to raise an alarm when errors are detected and combining the diagnostic testing with a self-healing process for automatically repairing errors detected and the diagnostic testing operates only on demand under automatic computer control; and
   download a new tailored service object from the directory service to the data store at the customer premise equipment instance in response to the monitored customer premise equipment object or the monitored tailored service object indicating that a new network service has been added to the one or more network services to deliver to the end-user appliance, wherein the customer premise equipment instance is configured to execute the new tailored service object to deliver the new network service to the end-user appliance, the new network service delivered concurrent with the diagnostic testing and delivered simultaneously with the monitoring.

2. The system recited in claim 1, wherein the one or more processors associated with the server are further configured to delete the tailored service object from the directory service and the data store at the customer premise equipment instance in response to the monitored customer premise equipment object or the monitored tailored service object indicating that the one or more network services to deliver to the end-user appliance have been removed.

3. The system recited in claim 1, wherein the one or more processors associated with the server are further configured to download an updated tailored service object from the directory service to the data store at the customer premise equipment instance in response to the monitored customer premise equipment object or the monitored tailored service object indicating that the one or more network services to deliver to the end-user appliance have been updated, wherein the customer premise equipment instance is configured to execute the updated tailored service object to update the one or more network services to deliver to the end-user appliance.

4. The system recited in claim 1, wherein the one or more processors associated with the server are further configured to download a new customer premise equipment object from the directory service to the data store at the customer premise equipment instance in response to the monitored customer premise equipment object or the monitored tailored service object indicating that a new end-user appliance has been added, wherein the customer premise equipment instance is configured to execute the new customer premise equipment object to deliver the one or more network services to the new end-user appliance.

5. The system recited in claim 1, wherein the one or more processors associated with the server are further configured to delete the customer premise equipment object from the directory service and the data store at the customer premise equipment instance in response to the monitored customer premise equipment object or the monitored tailored service object indicating that the end-user appliance has been removed.

6. The system of claim 1, wherein the customer premise equipment object to represent the customer premise equipment instance includes executable code, a configuration policy, or information related to one or more end-users.

7. The system of claim 1, wherein the tailored service object to provision the customer premise equipment instance includes executable code, a configuration policy, or information related to one or more end-users.

8. The system of claim 1, wherein the customer premise equipment instance includes a gateway, a router, or a hub and the end-user appliance connected thereto includes a personal computer, an entertainment device, a surveillance device, a household appliance, or a utility monitoring device.

9. The system of claim 1, wherein the one or more network services to deliver to the end-user appliance and the new network service to add to the one or more network services to deliver to the end-user appliance include broadband services or on-demand video services.

10. A method for automatically provisioning onsite networking services, comprising:
connecting a directory service to a customer premise equipment instance, wherein the directory service includes a customer premise equipment object to represent the customer premise equipment instance and a tailored service object to provision the customer premise equipment instance represented with the customer premise equipment object; and
creating the customer premise equipment object to represent the customer premise equipment instance and the tailored service object to provision the customer premise equipment instance in the directory service;
downloading the customer premise equipment object and the tailored service object from the directory service to a data store at the customer premise equipment instance, wherein the data store is configured to store the customer premise equipment object and the tailored service object at the customer premise equipment instance;
monitoring the customer premise equipment object or the tailored service object associated with the customer premise equipment instance in the directory service response to a request from the customer premise equipment instance;
enable diagnostic testing on the customer premise equipment and configure the customer premise equipment to log any errors detected and to raise an alarm when errors are detected and combining the diagnostic testing with a self-healing process for automatically repairing errors detected and the diagnostic testing operates only on demand under automatic computer control; and
downloading a new tailored service object from the directory service to the data store at the customer premise equipment instance in response to the monitored customer premise equipment object or the monitored tailored service object indicating that a new network service has been added to the one or more network services to deliver to the end-user appliance, wherein the customer premise equipment instance is configured to execute the new tailored service object to deliver the new network service to the end-user appliance, the new network service delivered concurrent with the diagnostic testing and delivered simultaneously with the monitoring.

11. The method recited in claim 10, further comprising deleting the tailored service object from the directory service and the data store at the customer premise equipment instance in response to the monitored customer premise equipment object or the monitored tailored service object indicating that the one or more network services to deliver to the end-user appliance have been removed.

12. The method recited in claim 10, further comprising downloading an updated tailored service object from the directory service to the data store at the customer premise equipment instance in response to the monitored customer premise equipment object or the monitored tailored service object indicating that the one or more network services to deliver to the end-user appliance have been updated, wherein the customer premise equipment instance is configured to execute the updated tailored service object to update the one or more network services to deliver to the end-user appliance.

13. The method recited in claim 10, further comprising downloading a new customer premise equipment object from the directory service to the data store at the customer premise equipment instance in response to the monitored customer premise equipment object or the monitored tailored service object indicating that a new end-user appliance has been added, wherein the customer premise equipment instance is configured to execute the new customer premise equipment object to deliver the one or more network services to the new end-user appliance.

14. The method recited in claim 10, further comprising deleting the customer premise equipment object from the directory service and the data store at the customer premise equipment instance in response to the monitored customer premise equipment object or the monitored tailored service object indicating that the end-user appliance has been removed.

15. The method of claim 10, wherein the customer premise equipment object to represent the customer premise equipment instance includes executable code, a configuration policy, or information related to one or more end-users.

16. The method of claim 10, wherein the tailored service object to provision the customer premise equipment instance includes executable code, a configuration policy, or information related to one or more end-users.

17. The method of claim 10, wherein the customer premise equipment instance includes a gateway, a router, or a hub and the end-user appliance connected thereto includes a personal computer, an entertainment device, a surveillance device, a household appliance, or a utility monitoring device.

18. The method of claim 10, wherein the one or more network services to deliver to the end- user appliance and the new network service to add to the one or more network services to deliver to the end-user appliance include broadband services or on-demand video services.

19. A system for automatically provisioning onsite networking services, wherein the system comprises a customer premise equipment instance having one or more processors configured to:
connect to a directory service that includes a customer premise equipment object to represent the customer premise equipment instance and a tailored service object to provision the customer premise equipment instance represented with the customer premise equipment object;
download the customer premise equipment object and the tailored service object from the directory service to a local data store at the customer premise equipment instance;
send the directory service a request to monitor the customer premise equipment object or the tailored service object associated with the customer premise equipment instance;
download a new tailored service object from the directory service to the local data store in response to the directory service determining that the monitored customer premise equipment object or the monitored tailored service object indicates that a new network service has been added to the one or more network services to deliver to the end-user appliance;
enable diagnostic testing on the customer premise equipment and configure the customer premise equipment to log any errors detected and to raise an alarm when errors are detected and combining the diagnostic testing with a self-healing process for automatically repairing errors detected and the diagnostic testing operates only on demand under automatic computer control; and
execute the new tailored service object to deliver the new network service to the end-user appliance connected to the customer premise equipment, the new network service delivered concurrent with the diagnostic testing and delivered simultaneously with the monitoring.

20. The system recited in claim 19, wherein the one or more processors associated with the customer premise equipment instance are further configured to delete the tailored service object from the local data store in response to the directory service determining that the monitored customer premise equipment object or the monitored tailored service object indicates that the one or more network services to deliver to the end-user appliance have been removed.

21. The system recited in claim 19, wherein the one or more processors associated with the customer premise equipment instance are further configured to:
download an updated tailored service object from the directory service to the local data store in response to the directory service determining that the monitored customer premise equipment object or the monitored tailored service object indicates that the one or more network services to deliver to the end-user appliance have been updated; and
execute the updated tailored service object to update the one or more network services to deliver to the end-user appliance connected to the customer premise equipment.

22. The system recited in claim 19, wherein the one or more processors associated with the customer premise equipment instance are further configured to:
download a new customer premise equipment object from the directory service to the local data store in response to the directory service determining that the monitored customer premise equipment object or the monitored tailored service object indicates that a new end-user appliance has been added; and
execute the new customer premise equipment object to deliver the one or more network services to the new end-user appliance connected to the customer premise equipment.

23. The system recited in claim 19, wherein the one or more processors associated with the customer premise equipment instance are further configured to delete the customer premise equipment object from the local data store in response to the directory service determining that the monitored customer premise equipment object or the monitored tailored service object indicates that the end-user appliance has been removed.

24. A method for automatically provisioning onsite networking services, comprising:
connecting a customer premise equipment instance to a directory service that includes a customer premise equipment object to represent the customer premise equipment instance and a tailored service object to provision the customer premise equipment instance represented with the customer premise equipment object;
downloading the customer premise equipment object and the tailored service object from the directory service to a local data store at the customer premise equipment instance;
sending a request to monitor the customer premise equipment object or the tailored service object associated with the customer premise equipment instance from the customer premise equipment to the directory service;
downloading a new tailored service object from the directory service to the local data store in response to the directory service determining that the monitored customer premise equipment object or the monitored tailored service object indicates that a new network service has been added to the one or more network services to deliver to the end-user appliance;
enable diagnostic testing on the customer premise equipment and configure the customer premise equipment to log any errors detected and to raise an alarm when errors are detected and combining the diagnostic testing with a self-healing process for automatically repairing errors detected and the diagnostic testing operates only on demand under automatic computer control; and
executing the new tailored service object at the customer premise equipment instance or the end-user appliance to deliver the new network service to the end-user appliance, the new network service delivered concurrent with the diagnostic testing and delivered simultaneously with the monitoring.

25. The method recited in claim 24, further comprising deleting the tailored service object from the local data store in response to the directory service determining that the monitored customer premise equipment object or the monitored tailored service object indicates that the one or more network services to deliver to the end-user appliance have been removed.

26. The method recited in claim 24, further comprising:
   downloading an updated tailored service object from the directory service to the local data store in response to the directory service determining that the monitored customer premise equipment object or the monitored tailored service object indicates that the one or more network services to deliver to the end-user appliance have been updated; and
   executing the updated tailored service object at the customer premise equipment instance or the end-user appliance to update the one or more network services to deliver to the end-user appliance.

27. The method recited in claim 24, further comprising:
   downloading a new customer premise equipment object from the directory service to the local data store in response to the directory service determining that the monitored customer premise equipment object or the monitored tailored service object indicates that a new end-user appliance has been added; and
   executing the new customer premise equipment object at the customer premise equipment instance or the new end-user appliance to deliver the one or more network services to the new end-user appliance.

28. The method recited in claim 24, further comprising deleting the customer premise equipment object from the local data store in response to the directory service determining that the monitored customer premise equipment object or the monitored tailored service object indicates that the end-user appliance has been removed.

* * * * *